March 2, 1937.    C. B. BUERGER    2,072,394
PROCESS OF CRACKING HYDROCARBON OILS
Filed July 21, 1926
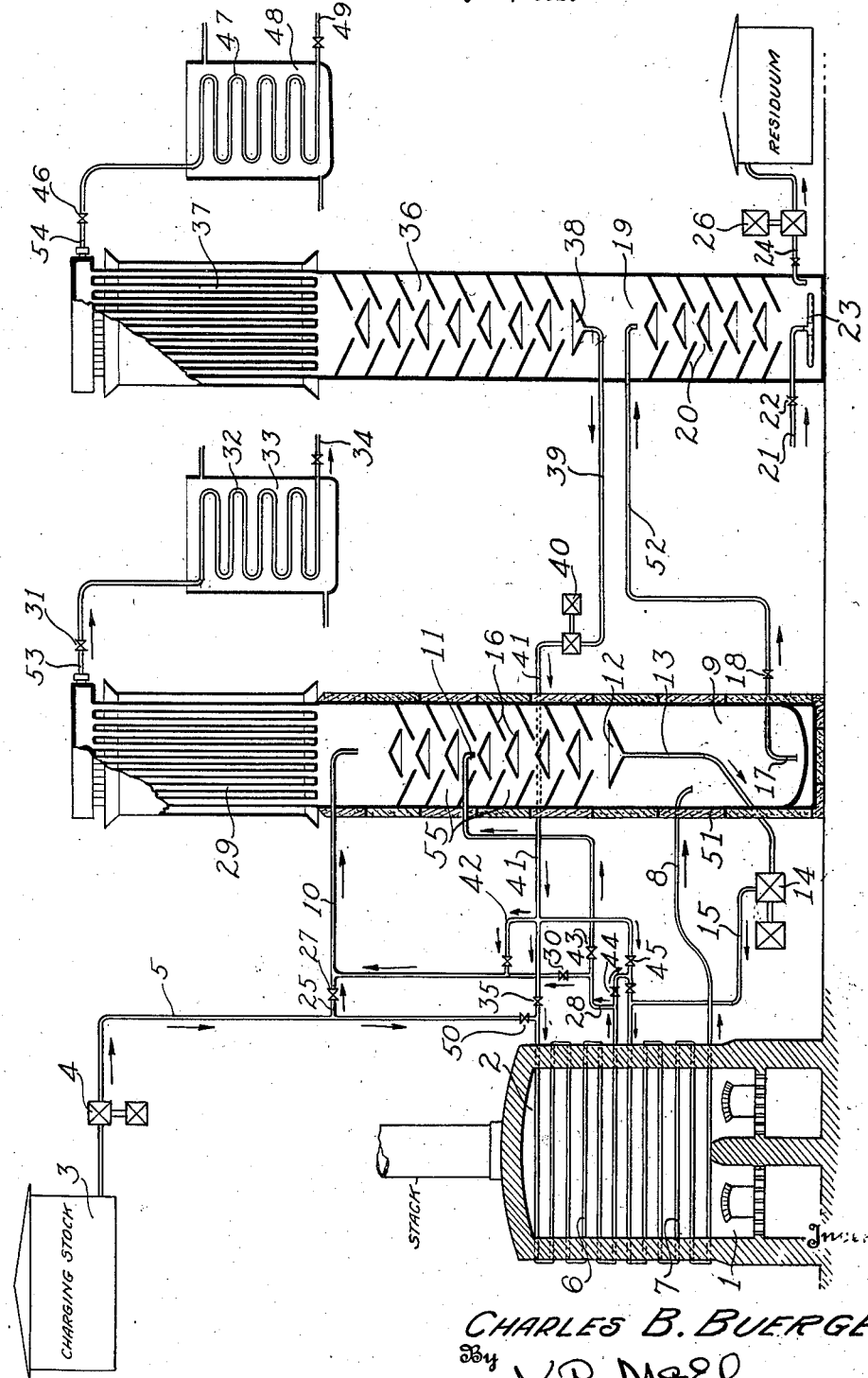
Charles B. Buerger,
By W. P. McElroy
Attorney Patented Mar. 2, 1937

2,072,394

UNITED STATES PATENT OFFICE 2,072,394

PROCESS OF CRACKING HYDROCARBON OILS

Charles B. Buerger, Pittsburgh, Pa., assignor, by mesne assignments, to Gulf Oil Corporation, Pittsburgh, Pa., a corporation of Pennsylvania Application July 21, 1926, Serial No. 123,906

7 Claims. (Cl. 196—48)

This invention relates to processes of cracking hydrocarbon oils; and it comprises continuously feeding fresh charging stock through a heating and vaporizing zone, introducing this heated and partly vaporized material into a separating chamber under a pressure substantially the same as that of the heating zone, subjecting the vapors from this separating chamber to selective condensation, returning a part of this condensate to the heating coils, removing the hot unvaporized residual oil to a second separating chamber, maintaining the second separating chamber at a pressure substantially lower than the first, subjecting the vapors from the second separating chamber to selective condensation, returning a portion of this condensate to the high pressure portion of the system, and removing from the second separating chamber any unvaporized oil; advantageously assisting the selective condensation of the vapors from the first separating chamber by contacting them with liquid oil introduced from another part of the system.

In the cracking of petroleum hydrocarbons it is common to subject oil to high temperature and subsequently introduce it to a chamber in which vaporization takes place, at the same time subjecting the vapors to selective condensation, and removing from the system any unvaporized residual oil.

The residual oil which it has been common to remove from the system has in the past carried with it and dissipated a large number of available heat units. It has also contained a considerable quantity of material having the characteristics most desired in a charging stock. The purpose of this invention is to conserve and utilize the major portion of the heat formerly removed from the system with the residuum, to separate from the residuum that portion having the characteristics desirable in a charging stock, and to use the conserved heat in the separation of this valuable portion from the residuum.

The objects of this invention are attained by conducting the residuum from the separating chamber with a minimum loss of heat directly to another separating chamber maintained at a substantially lower pressure. The oil exists in the first separating chamber under a higher pressure and is at the temperature of vaporization corresponding to that pressure. Upon being introduced into another separating chamber maintained at a lower pressure there becomes instantly available that heat which represents the difference between the heat content of the oil at its vaporizing temperature corresponding to the higher pressure and the heat content of the oil at its vaporizing temperature corresponding to the lower pressure. This available heat causes an immediate vaporization, and this vaporization may be increased by the introduction of steam— either saturated or superheated—into the zone where vaporization takes place. The vapors generated in this second separating chamber contain those constituents of the residuum having the characteristics most desired in a charging stock; by means of selective condensation these constituents are separated out, and are returned under an increased pressure to the higher pressure portion of the system, and care is taken in their condensation to maintain their temperature at as near to their boiling point as possible, with the result that they again enter the high pressure portion of the system at an elevated temperature.

The accompanying drawing is a diagrammatic illustration of this invention and the parts represented in the drawing and their operation are as follows: 1 represents a fire box in a furnace 2. Fresh charging stock is forced from a supply tank 3 by means of pump 4 through line 5 to the first set of coils 6 in the furnace 2. After the oil has been partially heated in the set of coils 6 a portion of the stream is discharged through line 28 past valve 30 and through line 10 into the dephlegmating tower 55 for a purpose to be described later. The remainder of the stream of oil from set of coils 6 enters the set of coils 7 situated immediately above the fire box in the furnace 2, and this set of coils discharges through line 8 into the separating chamber 9. The oil has undergone cracking and partial vaporization in the set of coils 7, and the stream issuing from line 8 is a mixture of oil vapors and liquid oil. Chamber 9 is provided only to permit separation of the vapors from the liquid, and no vaporization is anticipated therein. No direct heat is applied to chamber 9 and the heat of the oil may or may not be conserved at this point by the removable insulation 51. The quantity of liquid oil in chamber 9 is never permitted to exceed the small quantity necessary to seal the end of the residual oil removal line 17 against the passage of vapors. The vapors which separate from the stream issuing into chamber 9 from line 8 rise upward through the dephlegmating chamber 55 and the air-cooled tubular condenser 29 in which sections they are subjected to selective condensation. In passing upward through chamber 55 the vapors are forced by the baffles 16 to a circuitous path in which they are contacted with the liquid oil condensed in the air-cooled tubular condenser 29 and with liquid oil which has previously been heated in the set of coils 6 and is introduced through line 10 into the top of chamber 55. The condensate from the air-cooled tubular condenser 29 and the baffled dephlegmating section 55, together with the liquid oil introduced by line 10 are received by saucer 12 and conducted by line 13 to pump 14 which forces this material to the entrance of the cracking coils 7 in which it is again heated and from which it again passes to the separating and dephlegmating chambers. Any vapors not condensed in the baffled dephlegmating section 55 or the air-cooled tubular condenser 29 pass through the line 53 and the pressure regulating valve 31 to the condensing coil 32 situated in the water-filled condenser box 33, subsequently issuing at 34 to the usual receiving equipment. The selective condensation in sections 55 and 29 has been so controlled that the vapors issuing from the top of 29 consist of little other than the desired lower boiling point hydrocarbons. The separating chamber 9 is maintained empty as previously described by the continuous removal through line 17 of the unvaporized oil issuing into this chamber through line 8. This material removed through line 17 is the hot unvaporized liquid oil which in the processes common to the art carries away from the system the large amount of available heat as well as a considerable quantity of oil having the characteristics most desired in a charging stock. The valve 18 on the line 17 assists in maintaining the pressure on the separating chamber 9 and on the parts in open connection therewith, and during the operation of the process this valve is so regulated as to permit continuous removal of the liquid oil together with any particles of coke. By means of valve 46 the pressure in the second separating chamber 19 and the parts in open connection therewith is maintained at a point sufficiently above atmospheric pressure to permit the flow of the products issuing therefrom into respective stock tanks. The hot unvaporized residual oil from line 52, upon entering chamber 19 maintained at a pressure substantially lower than that under which the oil has previously existed immediately undergoes partial vaporization. This vaporization results from the excess of the heat content of the oil as it existed in chamber 9 over the normal heat content of the oil under the pressure maintained in chamber 19. On entering chamber 19 the unvaporized portion flows down over baffles 20, and may here be subjected to the further vaporizing influence of saturated or superheated steam introduced through the line 21, controlled by valve 22, and coil or spider 23. All vapors separating or generated in separating chamber 19 pass upward through baffled tower 36 and air-cooled tubular condenser 37 in which they are subjected to selective condensation, and all condensate herein is received by saucer 38 and conducted by line 39 to pump 40 which forces it through line 41 to the entrance of coil 6 to be recirculated through the system, or it may be forced through lines 41, 42 and 10 to assist the selective condensation conducted in 55 and 29, or it may be forced past valve 45 direct to the entrance of cracking coils 7. All vapors not condensed in the baffled tower 36 or the air-cooled tubular condenser 37 proceed past the valve 46 to the coil condenser 47 located in the water-filled condenser box 48 and discharge at 49 to the usual receiving equipment.

It is especially important that the selective condensation in 36 and 37 should be so controlled as to maintain the vapors leaving air-cooled tubular condenser 37 at a temperature well above the condensation temperature of steam under the pressure existing therein, in order that no steam may be condensed in the dephlegmating chamber and forced by pump 40 to the high pressure portion of the system.

The pump 26 for pumping unvaporized residuum from the bottom of separating chamber 19 may be omitted if a sufficient pressure is maintained on this part of the system to force the unvaporized residuum to its receiving tank.

There is also shown on the drawing line 25 controlled by valve 27, provided for the purpose of introducing cold charging stock from tank 3 into the top of dephlegmating chamber 55 through line 10. In this mode of operation valves 50, 30 and 44 are maintained closed and valves 35 and 43 are maintained open. With the valves so set the stream of material returning through line 41 from the lower pressure portion of the system passes through set of coils 6 in furnace 2 and proceeds from there through lines 28 and 11 into the dephlegmating tower 55 at a point midway of its height.

The dephlegmation in dephlegmating chamber 55 can be closely controlled by introducing various quantities of stock at various temperatures through lines 10 and 11.

While the invention illustrated and described covers the use of two separating chambers, each in open communication with a dephlegmating means and each separating chamber at a different pressure, the use of additional chambers, each in open communication with a dephlegmating means, each successive separating chamber maintained at a lower pressure, and returning condensate from each dephlegmator to a portion of the system existing at a higher pressure, is within the purview of my invention.

In operating this invention, as described, using what is commonly known in the industry as solar oil or gas oil for charging stock, and operating at a pressure slightly above 100 pounds the following temperatures have been noted:

| | Degrees Fahrenheit |
|---|---|
| Discharge of pump 4 | 80 to 150 |
| Discharge of pump 40 | 500 |
| Discharge of coil 6 | 600 |
| Discharge of coil 7 | 850 to 950 |
| Separating chamber 9 | 800 |
| Line 13 | 650 |
| Line 19 | 600 |
| Line 53 | 350 |
| Line 54 | 350 |
| Separating chamber 19 | 600 |
| Line 24 | 600 |
| Line 39 | 500 |

The discharge of pump 14 was maintained from 50 to 100 pounds higher than the pressure in chamber 9 to allow for friction through the heating coil. The discharge of pump 4 was maintained from 10 to 25 pounds higher than the discharge of pump 14. The discharge of pump 40 was maintained at the same pressure as the discharge of pump 4 and the pressure in separating chamber 19 was maintained sufficiently above atmospheric pressure to overcome the friction of the liquid being discharged through the pipe lines. Operating this system with pressures of from 100 pounds to 300 pounds in chamber 9 has been very successful, and the use of this system as described or with additional separating chambers in series, with heating coil pressures up to and even in excess of one thousand pounds, is contemplated.

What I claim is:—

1. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of the separated vapors, substantially reducing the pressure on and introducing steam into this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage and returning a portion of this condensate back into the principal stream at a point in the heating stage where the temperature of the stream of flowing oil has already been very substantially elevated but has not yet attained its final temperature, and selectively condensing the mixture of oil and water vapors from the second vapor separating stage and thereby separately securing a desired water-free oil fraction and returning this fraction for further cracking to the principal stream at the commencement of the heating stage.

2. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of the separated vapors, substantially reducing the pressure on and introducing steam into this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage and returning a portion of this condensate for further cracking back into the principal stream at a point in the heating stage where the temperature of the stream of flowing oil has already been very substantially elevated but has not yet attained its final temperature, and selectively condensing the vapors from the second vapor separating stage and returning a portion of this condensate to the principal stream at the commencement of the heating stage.

3. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of the separated vapors, substantially reducing the pressure on this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage and returning a portion of this condensate for further cracking back into the principal stream at a point in the heating stage where the temperature of the stream of flowing oil has already been very substantially elevated but has not yet attained its final temperature, and selectively condensing the vapors from the second vapor separating stage and returning a portion of this condensate to the principal stream at the commencement of the heating stage.

4. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of and communication with the separated vapors, substantially reducing the pressure on and introducing steam into this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage aiding this selective condensation by directly contacting the separated vapors with introduced liquid oil and returning a portion of this condensate for further cracking back into the principal stream at a point in the heating stage where the temperature of the stream of flowing oil has already been very substantially elevated but has not yet attained its final temperature, and selectively condensing the mixture of oil and water vapors from the second vapor separating stage and thereby separately securing a desired water-free oil fraction, employing a part of this desired fraction as the before mentioned liquid oil used to aid selective condensation of the vapors from the first separating stage, and returning the remainder of this desired fraction to the principal stream at a point in the heating stage where the temperature of the stream of flowing oil has already been very substantially elevated but has not yet attained its final temperature.

5. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of the separated vapors, substantially reducing the pressure on and introducing steam into this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage aiding this selective condensation by directly contacting the separated vapors with introduced liquid oil and returning a portion of this condensate for further cracking back into the principal stream at a point in the heating stage where the temperature of the stream of flowing oil has already been very substantially elevated but has not yet attained its final temperature, and selectively condensing the mixture of oil and water vapors from the second vapor separating stage and thereby separately securing a desired water-free oil fraction, employing a part of this desired fraction as the before mentioned liquid oil used to aid selective condensation of the vapors from the first separating stage, and returning the remainder of this desired fraction to the principal stream at the commencement of the heating stage.

6. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of the separated vapors, substantially reducing the pressure on and introducing steam into this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage aiding this selective condensation by directly contacting the separated vapors with introduced liquid oil identical with that which initially constituted the beforementioned principal stream, and returning a portion of this condensate for further cracking back into the principal stream at a point in the heating stage where the temperature of the stream of flowing oil has already been very substantially elevated but has not yet attained its final temperature, and selectively condensing the mixture of oil and water vapors from the second vapor separating stage and thereby separately securing a desired water-free oil fraction, and returning this fraction for further cracking to the principal stream at the commencement of the heating stage.

7. The process of cracking petroleum oils which comprises setting into motion a continuous forwardly moving principal stream of oil, heating this forwardly moving stream and progressively raising its temperature up to a cracking temperature and effecting partial vaporization thereof, conducting the heated stream to an enlarged zone and there continuously separating the vaporized portion from the unvaporized portion of the oil, continuously removing substantially all of the unvaporized portion of the oil from the presence of the separated vapors, substantially reducing the pressure on and introducing steam into this unvaporized oil and thereby effecting additional vaporization thereof, continuously removing substantially all liquid oil from the presence of the vapors of the second separating step and discharging this oil from the process, maintaining the oil during the heating stage and first vapor separating stage under pressure substantially above atmospheric, selectively condensing the vapors from the first separating stage aiding this selective condensation by directly contacting the separated vapors with introduced liquid oil and returning a portion of this condensate for further cracking back into the principal stream at a point in the heating stage where the temperature of the stream of flowing oil has already been very substantially elevated but has not yet attained its final temperature, and selectively condensing the mixture of oil and water vapors from the second vapor separating stage and thereby separately securing a desired water-free oil fraction, and returning this fraction for further cracking to the principal stream at the commencement of the heating stage, and withdrawing a portion of the oil from the principal stream at a point in the heating stage where the temperature of the stream of flowing oil has already been very substantially elevated but has not yet attained its final temperature, using this heated oil to constitute the liquid oil used to assist selective condensation of the vapors from the first vapor separating stage.

CHARLES B. BUERGER.